Dec. 1, 1936.  E. H. MUELLER  2,062,424

ATTACHING MEANS FOR HANDLES

Filed May 27, 1935

INVENTOR.
Ervin H. Mueller,
BY
ATTORNEYS

Patented Dec. 1, 1936

2,062,424

UNITED STATES PATENT OFFICE 2,062,424

ATTACHING MEANS FOR HANDLES

Ervin H. Mueller, Grosse Pointe Park, Mich.

Application May 27, 1935, Serial No. 23,632

4 Claims. (Cl. 287—53)

This invention relates to means for attaching a handle or other part, for applying power to a shaft or stem, for turning the same, and more particularly to means for frictionally holding a comparatively fragile handle to the stem of a gas range valve or other device where the strain of turning the stem is liable to crack the handle, particularly where such handle is in any way weakened by the application of fastening means thereto.

It has been common practice to attach such handles to stems or shafts by flattening one side of the end of the stem and forming a socket in the handle, of a cross sectional shape to closely fit and conform to the cross sectional shape of the stem, to prevent rotation of the handle on the stem, by the engagement of the flat side of the socket with the flat side of the stem, and then securing the handle by means of a screw or the like against working loose and slipping endwise off the stem, but in applying such screw to the handle, the fragile handle is weakened and is liable to be broken in use. It has also been the practice to split the stem longitudinally inward from its end and make it slightly larger in diameter than the diameter of the handle socket so that in applying the handle, the split parts will yield toward each other and thus frictionally engage opposite sides of the socket, but when twisting strain is put upon the handle the split parts will further yield and in time the handle will become loose on the stem and come off and the stem is also weakened by splitting it and the split parts are liable to become crystallized and break under constant bending.

The object of the present invention is to overcome the defects of prior structures and provide a construction wherein neither handle nor stem is weakened and separate frictionally holding means is applied to the stem in such a manner as not to weaken the stem or necessitate any change in the handle, and which construction is such as to facilitate manufacture and is cheap to produce.

With the above and other ends in view the invention consists in the matters hereinafter more fully described and illustrated in the accompanying drawing, in which.

Figure 2:
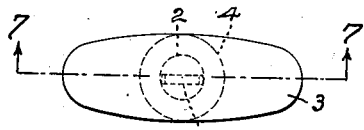
Fig. 2 is a plan view of the upper end of Fig. 1.
Figure 9:
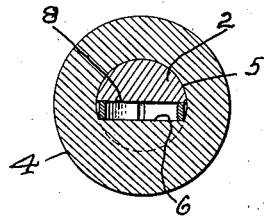
Fig. 9 is a transverse section upon the line 9—9 of Fig. 1.
Figure 1:
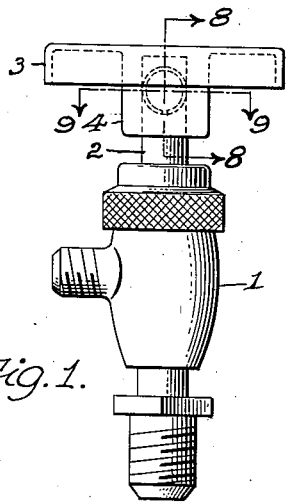
Fig. 1 is a side elevation of a valve showing a handle applied to the stem thereof and illustrative of an application of the present invention in use.
Figure 7:
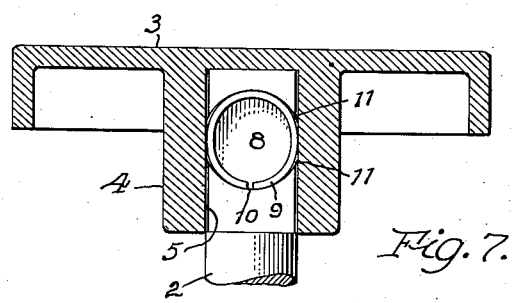
Fig. 7 is an enlarged transverse section of the handle upon the line 7—7 of Fig. 2 and showing the same as applied to the stem.
Figure 8:
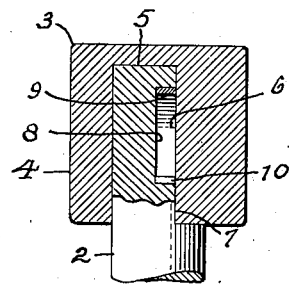
Fig. 8 is a vertical section upon the line 8—8 of Fig. 1.
Figure 6:
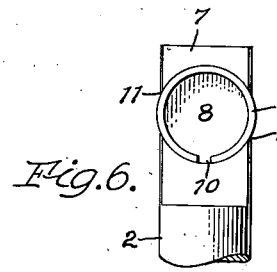
Fig. 6 is a side elevation of the upper end portion of a stem and showing the spring in place thereon.
Figure 4:
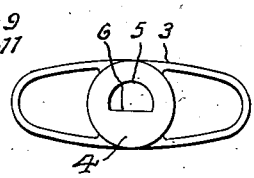
Fig. 4 is a bottom plan view of the handle attached.
Figure 3:
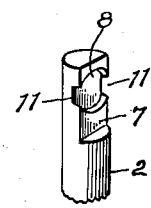
Fig. 3 is a perspective view of the upper end portion of a stem or shaft to which a handle is to be applied.

As illustrative of an application in use of the present invention, a gas range valve, indicated as a whole by the numeral 1, is shown, this valve being of an old and well known construction, and having a stem 2 to which a handle 3 for turning the stem is applied, said handle as commonly constructed for gas stoves, being formed of bakelite, porcelain or other comparatively fragile material and provided with a hub portion 4 formed with a socket 5 extending therein to form its lower or free end. This socket is formed semi-circular in cross section with a flat or straight side 6 and the upper end portion of the stem 2 is semi-cylindrical in cross section, said stem being cut away at one side, as at 7 to provide a flat side to engage the flat side 6 of the socket and thus prevent the handle from turning upon the stem, this end portion of the stem being of cross sectional dimensions to fit closely within the socket.

To frictionally hold the stem within the socket 5, the flat side 7 of the stem is formed with a recess 8 of circular form and which recess cuts through the side edges of the flat side of the stem, and within this circular recess is placed a circular spring 9 formed of a narrow flat strip of spring metal with the ends of the spring spaced a short distance apart, as at 10, to permit the spring to contract under pressure. This spring is placed within the recess 8 and this recess is of substantially the same depth as the width of the strip forming the spring so that the spring will lie flush with the surface of the stem 7. When the spring is in place within the recess it expands therein, projecting the sides of the spring through the side openings 11 in the recess 8 where it cuts through the side edges of the flat portion 7 of the stem. When the handle is forced endwise upon the stem the spring will be slightly compressed by the opposite sides of the socket coming into contact with the portions of the spring which project through the openings 11 and thus the spring frictionally engages opposite sides of the socket 5 adjacent the plane of the flat sde 7 of the stem, frictionally holdng the handle in place upon the stem against its becoming displaced endwise from the stem in use, the spring exerting a constant friction and thus preventing the handle from working loose in turning the stem. As the end of the stem fits closely within the socket of the hub 4 of the handle with the flat side of the stem in firm engagement with the flat side of the socket, the handle is firmly held against rotation upon the stem and the disposition of the spring is such that by its frictional contact with the sides of the socket in the handle, the handle is held against becoming displaced endwise from the stem.

This construction is such as to facilitate manufacture, the recess 8 being formed by boring into the flat surface 7 of the stem and the spring is simply a split ring wihch is easily formed and readily inserted within the recess 8 and because of its position within the recess 8, is subjected to very little strain but puts a considerable frictional pressure upon the walls of the socket to hold the handle in place.

Preferably the spring 9 is placed in the recess 8 with the split in the spring located toward the inner end of the flat side 7 of the stem so that when the handle is forced upon the stem and the spring compressed thereby, the direction of the force applied to the spring will be toward the split 10, thus causing the spring to yield more readily in that direction than when the handle is pulled from the stem, thus applying the force in the opposite direction or toward the closed side of the spring so that the spring will not contract as readily as when the handle is forced endwise upon the stem and toward the split in the spring.

Figures 5, 10:
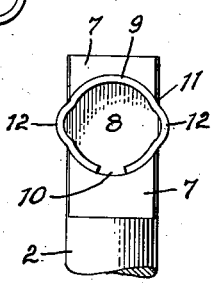
Fig. 5 is a detail showing a spring in side elevation.
Fig. 10 is a detail similar to Fig. 6 and showing a modified form of spring.

As shown in Fig. 10 the spring 9 is formed with outwardly extending side bulges or projections 12, these bulges or projections being formed by bending the spring at each side so that these bulged portions 12 will project through the openings 11 in the sides of the recess 8 and frictionally contact the sides of the socket in the handle. These bulges also form means for locating and holding the ring in proper position within the recess with the split 10 in the ring located at the bottom of the recess or toward the inner end of the flat side 7 of the stem. When the spring is thus formed with these bulges, the diameter of the recess 8 may be less than where the ring is a circle for in this instance the bulges will project through the openings 11 a greater distance than where the spring is circular and therefore a greater frictional contact may be had between the spring and the side walls of the socket in the handle.

Figure 11:
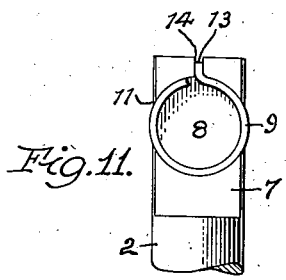
Fig. 11 is a view similar to Fig. 10 and showing a further modified spring construction.

As shown in Fig. 11 the spring 9 is formed circular but one end 13 of the spring is turned outwardly to engage a notch 14 in the wall of the recess for the purpose of holding the spring properly positioned within said recess.

With this construction, where the handle is formed of a fragile material, such as bakelite, the full strength of the handle is retained as it is not necessary to bore the hub 4 to receive a screw for fastening the handle to the stem or to otherwise weaken the handle in providing means for holding it in place upon the stem, and further it is unnecessary to split the stem longitudinally in order to secure a frictional contact between stem and walls of the socket. The stem is therefore left in the condition where it provides full strength and is not liable to be broken by a constant flexing of the spring portions of the split end but the recess in the flat side of the end gives full strength to the stem and the spring provides the necessary frictional engagement to hold the handle firmly in place on the stem.

Obviously changes in the construction other than those shown in the drawing may be made without departing from the spirit of the invention, and I do not therefore limit myself to the particular construction, arrangement and combination of elements shown.

Having thus fully described my invention, what I claim is:—

1. Means for the purpose described including a stem having an end portion formed with a circular recess cutting through opposite sides of said end portion, and an annular spring in said recess with portions of said spring projecting from said recess at opposite sides of said stem.

2. Means for the purpose of detachably attaching a handle having a socket to a stem received in said socket, a stem having a plane side face formed with a circular recess open through said face and through opposite sides of said stem at the edges of said face, a split spring ring in said recess with opposite side portions of said ring projecting from said recess laterally of said stem and means for preventing rotation of said ring in said recess.

3. Means as characterized in claim 2 and wherein said spring ring is formed from a flat metal strip bent into ring form with its ends spaced apart, said strip being of a width substantially equal to the depth of said recess.

4. Means as characterized in claim 2 and wherein said spring ring is formed with projecting portions to project from said recess through openings at opposite sides of said recess to engage the wall of the socket and to hold said spring with its split side located at the side of the recess farthest removed from the end of the stem.

ERVIN H. MUELLER.